US000001971H

(19) United States

(12) Statutory Invention Registration

Joyner et al.

(10) Reg. No.: US H1971 H

(43) Published: Jul. 3, 2001

(54) SHOT RECOVERY SYSTEM AND METHOD

(75) Inventors: Charles Warren Joyner, Candler; James Michael Fox, Fletcher, both of NC (US)

(73) Assignee: Meritor Heavy Vehicle Systems, Inc., Troy, MI (US)

(21) Appl. No.: 09/392,751

(22) Filed: Aug. 16, 1999

(51) Int. Cl.[7] ..... B21D 39/02

(52) U.S. Cl. ..... 72/53; 451/38; 451/39

(58) Field of Search ..... 72/53; 451/38, 451/39

(56) References Cited

U.S. PATENT DOCUMENTS

| | | | | |
|---|---|---|---|---|
| 3,199,171 | * | 8/1965 | Hellman et al. | 72/53 |
| 3,276,234 | * | 10/1966 | Physioc III | 72/53 |
| 3,624,967 | * | 12/1971 | Kamper et al. | 72/53 |
| 4,614,100 | * | 9/1986 | Green et al. | 72/53 |
| 4,753,094 | * | 6/1988 | Spears | 72/53 |
| 6,038,900 | * | 3/2000 | Miyasaka | 72/53 |

* cited by examiner

*Primary Examiner*—Harold J. Tudor

(74) *Attorney, Agent, or Firm*—Howard & Howard

(57) ABSTRACT

A shot-peening assembly for dispelling shot onto a workpiece includes a discharging device for dispelling shot onto the workpiece. The shot-peening assembly also includes a reservoir for collecting the shot dispelled from the discharging device. The assembly further includes a transfer tube defining a fluid passageway between the reservoir and the discharging device for recirculating the shot from the reservoir back to the discharging device. A fluid nozzle of the assembly is interposed between the reservoir and the transfer tube for conveying the shot through the fluid passageway.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SHOT RECOVERY SYSTEM AND METHOD

BACKGROUND OF THE INVENTION

The subject invention relates to an improved shot recovery system and method for recovering shot in a shot-peening process.

The application of shot-peening to treat a workpiece is well known in the art. In this application, a stream of shot, small metal particles, is discharged at a surface of the workpiece at a high velocity to treat the surface of the workpiece. Shot-peening machines have been developed to effectively treat large numbers of workpieces in a mass-production environment. At some interval in mass-production, it is necessary to recover the spent shot in order to maximize the efficiency of the shot-peening machines. More specifically, after the shot has been discharged toward the workpiece, the spent shot is recovered in a collection reservoir so that the recovered shot can now be recycled and re-used in the shot-peening machine.

To recover the shot, conventional shot-peening machines employ mechanical devices to convey the recovered shot to a shot supply hopper. The mechanical devices employed to convey the recovered shot are susceptible to structural degradation due to forces, such as friction, contributed by the shot. As a result, operation of conventional shot-peening machines that employ a mechanical device to convey the recovered shot is expensive due to repair, replacement, and production downtime costs.

It is an object of the subject invention to provide a shot recovery system and method for recovering shot that avoids the mechanical conveyance of shot by utilizing fluid forces to convey shot in the shot recovery process.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
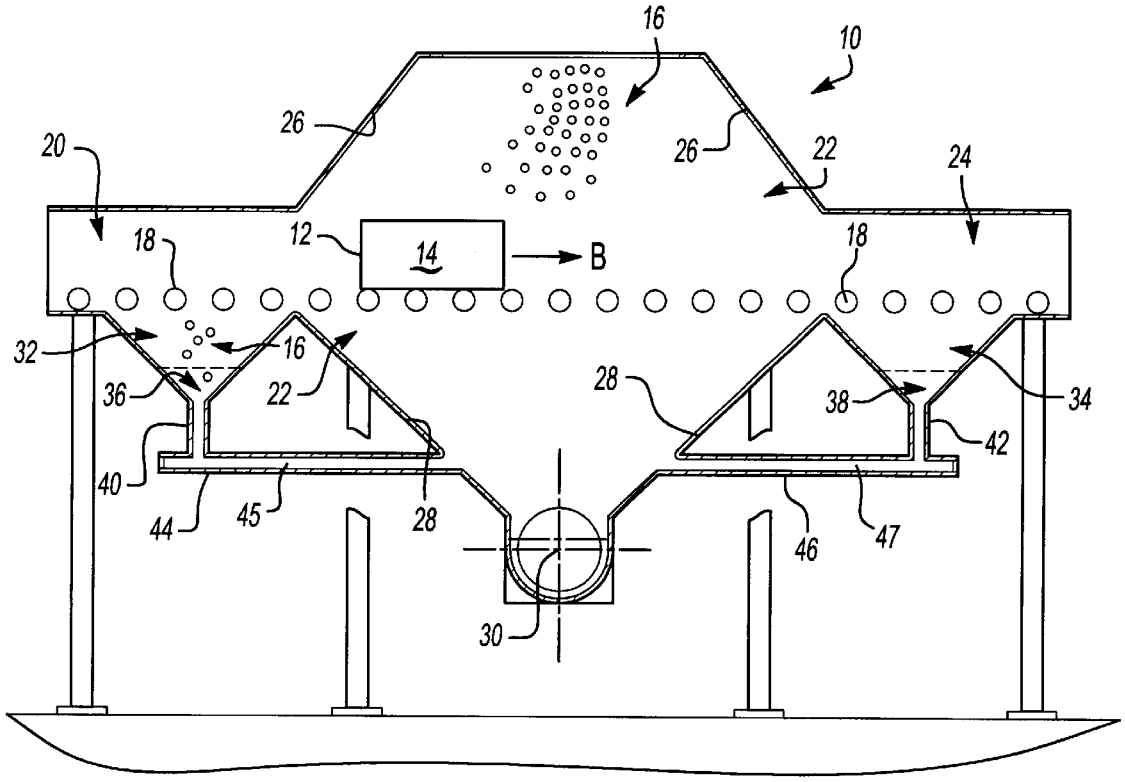
FIG. 1 is a cross-sectional view of a shot-peening machine showing, in particular, the overall relationship of the subject invention to the shot-peening machine.

Referring to the Figures, wherein like numerals indicate like or corresponding parts throughout the several views, a shot-peening machine for treating a surface 12 of a workpiece 14 is generally shown at 10 in FIG. 1. A shot discharging device (not shown), such as a blast wheel, dispels shot 16 onto the surface 12 of the workpiece 14 at a high velocity. The machine 10 includes a workpiece conveyor 18 for continuously conveying the workpiece 14 through the machine 10 in a mass-production environment.

More specifically, the machine 10 includes an inlet vestibule 20, a central shot chamber 22, and an outlet vestibule 24. The central shot chamber 22 includes an upper canopy 26 and a primary collection reservoir 28. Although not shown in the Figures, the shot discharging device is positioned within the central shot chamber 22. The upper canopy 26 deflects the shot 16 dispelled from the shot discharging device downward into the primary collection reservoir 28. The primary collection reservoir 28 collects the shot 16 after the shot 16 has been dispelled from the shot discharging device onto the workpiece 14. Further, the primary collection reservoir 28 integrally houses a central auger 30 for transferring the shot 16 from the primary collection reservoir 28 to a shot supply hopper (not shown) for recycling purposes.

An inlet collection reservoir 32 is disposed below the inlet vestibule 20 for receiving the shot 16 that is not collected in the primary collection reservoir 28. As appreciated, the inlet collection reservoir 32 receives the shot 16 that strays from the central shot chamber 22 and is not deflected downward by the upper canopy 26. Also, since the inlet collection reservoir 32 is positioned upstream from the shot discharging device and the central shot chamber 22, the inlet collection reservoir 32 may also receive the shot 16 from workpieces 14 that are processed through the machine 10 for additional shot-peening treatment. Similar to the inlet collection reservoir 32, an outlet collection reservoir 34 is disposed below the outlet vestibule 24 for receiving the shot 16 that is not collected in the primary collection reservoir 28. Preferably, both the inlet collection reservoir 32 and the outlet collection reservoir 34 are substantially V-shaped having respective collection apexes 36, 38. As such, the substantially V-shaped configuration of the reservoirs 32, 34 naturally funnels the shot 16 toward the collection apexes 36, 38.

A first shot transfer port 40 is disposed at the collection apex 36 of the inlet collection reservoir 32, and a second shot transfer port 42 is disposed at the collection apex 38 of the outlet collection reservoir 34. The first shot transfer port 40 connects to a first transfer tub 44 for conveying the shot 16 to the primary collection reservoir 28 where the shot 16 is recycled to the shot supply hopper via the central auger 30. Therefore, the first transfer tube 44 defines a first fluid passageway 45 between the inlet collection reservoir 32 and the shot discharging device for recirculating the shot 16 from the inlet collection reservoir 32 back to the shot discharging device.

Similarly, the second shot transfer port 42 connects to a second transfer tube 46 for conveying the shot 16 to the primary collection reservoir 28. Therefore, the second transfer tube 46 defines a second fluid passageway 47 between the outlet collection reservoir 34 and the shot discharging device for recirculating the shot 16 from the outlet collection reservoir 34 back to the shot discharging device. The shot transfer ports 40, 42 and the transfer tubes 44, 46 establish a generally T-shaped configuration.

Figure 2:
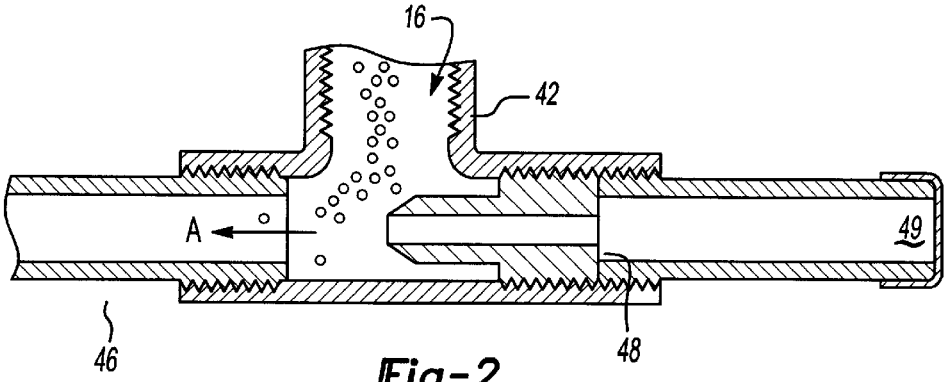
FIG. 2 is a cross-sectional view of a fluid nozzle conveying shot from a collection reservoir.

Referring specifically to FIG. 2, a fluid nozzle 48 is interposed between the outlet collection reservoir 34 and the second transfer tube 46 for conveying the shot 16 through the second fluid passageway 47. FIG. 2 is specific only to the fluid nozzle 48 associated with the outlet vestibule 24, the outlet collection reservoir 34, and the second transfer tube 46. However, as appreciated, a fluid nozzle (not shown) is similarly associated with the inlet vestibule 20, the inlet collection reservoir 32, and the first transfer tube 44. A pressurized air supply shown schematically at 49 provides a horizontal air flow (A) through the fluid nozzle 48 toward the primary collection reservoir 28 in order to convey the shot 16 descending from the shot transfer port 42 into the second transfer tube 46 for transfer through the second fluid passageway 47 to the primary collection reservoir 28. That is, a Venturi effect is produced to convey the shot 16.

During operation of the machine 10, the workpiece 14 enters the inlet vestibule 20 on the workpiece conveyor 18 proceeding toward the central shot chamber 22 in direction B. As the workpiece 14 is conveyed across the central shot chamber 22, the shot discharging device continuously discharges the shot 16 at the workpiece 14. Continuing, the shot 16 is randomly dispelled throughout the central shot chamber 22. The majority of the shot 16 descends naturally into the primary collection reservoir 28. Further, the upper canopy 26 of the central shot chamber 22 deflects any redirected shot 16 back downward into the primary collection reservoir 28. However, a smaller portion of the shot 16, is deflected into the inlet 20 and outlet 24 vestibules.

When the shot 16 is dispelled into the inlet 20 and outlet 24 vestibules, the shot 16 descends into the inlet 32 and outlet 34 collection reservoirs, respectively. The stray shot 16 is funneled from the reservoir 32, 34 into the shot transfer ports 40, 42. As the shot 16, descends through the shot transfer ports 40, 42, the horizontal air flow (A) draws the descending shot 16 out of the shot transfer ports 40, 42 and into the transfer tubes 44, 46 for transfer to the primary collection reservoir 28. As initially discussed above, the effect of the horizontal air flow (A) drawing the descending shot 16 out of the shot transfer ports 40, 42 and into the transfer tubes 44, 46 is known in the art as a Venturi effect.

Finally, because the shot 16 is conveyed by fluid forces, and not by mechanical devices, there is minimal opportunity for mechanical wear and other structural degradation.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A shot-peening assembly for dispelling shot onto a workpiece, said assembly comprising:

a discharging device for dispelling shot onto the workpiece;

a reservoir for collecting said shot dispelled from said discharging device;

a transfer tube defining a fluid passageway between said reservoir and said discharging device for recirculating said shot from said reservoir back to said discharging device; and a fluid nozzle interposed between said reservoir and said transfer tube for conveying said shot through said fluid passageway.

* * * * *